Sept. 11, 1956 R. D. FORREST 2,762,936
DIODE, PULSE-GATING CIRCUITS
Filed Dec. 20, 1952

INVENTOR.
BY RICHARD D. FORREST,
Seymour M. Rosenberg
ATTORNEY.

United States Patent Office 2,762,936
Patented Sept. 11, 1956

2,762,936

DIODE, PULSE-GATING CIRCUITS

Richard D. Forrest, Los Angeles, Calif., assignor, by mesne assignments, to Hughes Aircraft Company, a corporation of Delaware Application December 20, 1952, Serial No. 327,133

5 Claims. (Cl. 307—88.5)

This invention relates to diode, pulse-gating circuits and, more particularly, to improvements in diode, pulse-gating circuits utilized for applying triggering pulses to flip-flop circuits in response to an applied voltage-state signal and a counting or timing pulse.

The present invention is an improvement over a conventional type of pulse-gating circuit shown in Fig. 1 of this application. A gating circuit of this conventional type is also shown, for example, in Fig. 6a of U. S. Patent 2,644,887 to A. E. Wolfe, Jr.

The pulse-gating circuit shown in Fig. 1 of this application is particularly useful where a plurality of flip-flops are to be triggered simultaneously in response to applied counting or timing pulses, the pulses being applied to each of the flip-flops through a single, associated pulse-gating circuit. At least one voltage-state signal is utilized to control each of the pulse-gating circuits. In the case of a binary counter, for example, the voltage-state signals are derived from the states of conduction of certain of the flip-flops in the counter.

While the pulse-gating circuit shown in Fig. 1 of this application functions satisfactorily under normal operating conditions, there are certain operating conditions which may cause the pulse-gating circuit to produce a spurious trigger pulse, which, of course, is undesirable. Although these operating conditions may occur infrequently, the simplicity of the present invention makes it economically feasible to insure against such contingencies. This is particularly true where the pulse gating circuits are utilized in a digital computer.

The particular operating conditions which may cause a spurious pulse to pass through the conventional gating circuit shown in Fig. 1 of this application occur when a flip-flop providing one of the voltage-state signals is to be triggered by the same counting or timing pulse which is applied to the pulse-gating circuit, such that its voltage-state signal is changed from a high level to a low level. If the flip-flop providing the voltage-state signal is slow in responding to the triggering pulse or if the triggering pulse is delayed in transmission to the flip-flop, the delayed change in the voltage-state signal causes the gating circuit of Fig. 1 to produce a second pulse which may again trigger the flip-flop to be controlled.

Another feature of the present invention is that the pulse-gating circuits defined thereby may be utilized to provide combined "and" and "or" logic, as well as the "and" logic provided by the pulse-gating circuits of the type shown in Fig. 1. If voltage-state signals $a$ and $b$ are applied to separate input terminals of the pulse-gating circuit, and a count pulse $Cp$ is applied to a third input terminal, a pulse is applied to a flip-flop to be controlled when either or both of signals $a$ and $b$ are high-level signals representing binary 1, and a count pulse is applied. The logic of this condition may be expressed as: $(a+b).Cp$; where the plus (+) represents the logical "or" and the dot (.) the logical "and."

The gating circuit of the present invention may also provide the logic: $a.b.Cp$, if signal $a.b.$ produced by a lower-level "and" circuit is applied to one input terminal of the gating circuit and signal $Cp$ applied to a second input terminal of the gating circuit.

The basic embodiment of the present invention comprises: a pulse-gating diode; a gating resistor having one end connected to the pulse-gating diode, and the other end connected to a reference-potential source; and $n$ input diodes coupled in parallel to the junction of the gating resistor and the pulse-gating diode, the letter $n$ being utilized to indicate that there may be any number of input diodes. A voltage-state signal is applied to each of the $n$ input diodes; the output signal produced thereby being defined by the function $(a+ \ldots + \ldots + \ldots + n).Cp$, where the letters $a$ through $n$ are utilized to indicate voltage signals applied to input diodes $a$ through $n$, respectively.

Accordingly, it is an object of the present invention to provide a diode, a pulse-gating circuit, wherein no spurious trigger pulse is caused due to the delayed change of an applied voltage-state signal from a high level to a low level.

Another object is to provide a pulse-gating circuit, wherein "and" and "or" logic may be combined.

Still another object is to provide an improved diode, pulse-gating circuit for applying pulse signals to an input circuit of a flip-flop in response to the high-level state of a 2-level control signal.

The novel features which are believed to be characteristic of the invention, both as to its organization and the method of operation, together with further objects and advantages thereof, will be better understood from the following description considered in connection with the accompanying drawings in which two embodiments of the invention are illustrated by way of examples. It is to be expressly understood, however, that the drawings are for the purpose of illustration and description only, and are not intended as a definition of the limits of the invention.

Figure 1:
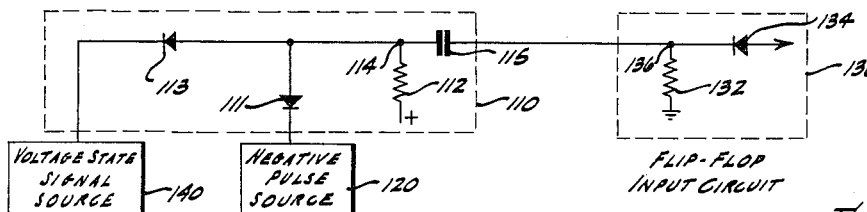
Fig. 1 is a schematic diagram of a conventional type of pulse-gating circuit for providing an "and" function.
Figures 3, 4:
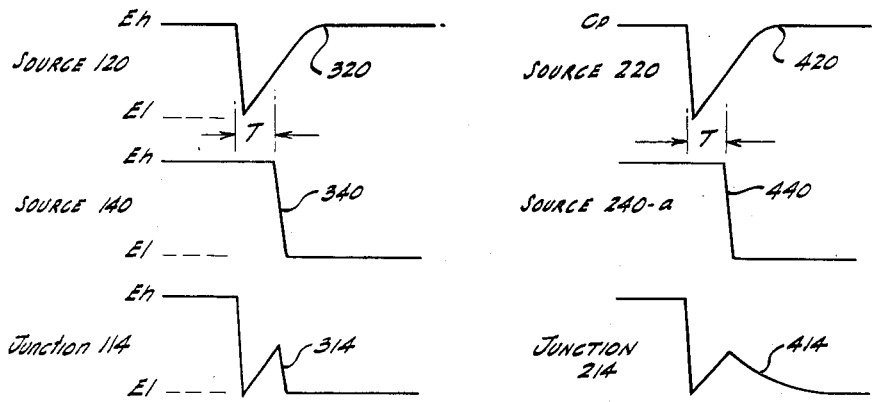
Fig. 3 is a composite diagram of the wave forms of signals which occur under certain operating conditions in the pulse-gating circuit shown in Fig. 1.
Fig. 4 is a composite diagram of the wave forms of signals which occur, under the same operating conditions as those illustrated in Fig. 3, in the pulse-gating circuit shown in Fig. 2.

In order to fully understand the operation of the pulse-gating circuit provided by the present invention it is necessary to consider the operation of the pulse-gating circuit shown in Fig. 1 of this specification; the wave forms of signals appearing in the circuit of Fig. 1 during an illustrative operation being shown in Fig. 3. The operation of the circuit shown in Fig. 1 will be considered only to the extent necessary to point out the improvement provided by the present invention with respect to the possibility of spurious triggering signals being produced. Reference may be made to the patent to Wolfe for further details with respect to the manner in which the circuit shown in Fig. 1 provides the desired "and" function.

Wave forms 320 and 340, shown in Fig. 3, illustrate the types of signals which may be produced by negative pulse source 120 and voltage-state, signal source 140, respectively. It will be noted that wave forms 320 and 340 represent negative-going signals; signal 320 dropping first from a high level $Eh$ to a low level $El$, and signal 340 falling from level $Eh$ to level $El$ after a time interval designated as "T." Although in most systems using voltage-state gating circuits, all flip-flops are triggered simultaneously by counting or timing pulses, the delay T may be due to a pulse-transmission delay in passing a pulse signal through a cable, or it may be due to the delayed reaction of a flip-flop producing the voltage-state signal.

Since diodes 111 and 113 become front biased, respectively, when the signal produced by source 120 assumes a lower level than that produced by source 140, and vice-versa; it is apparent that signal 314, appearing at junction 114, in Fig. 1, assumes a waveshape similar to the lower-level portion of each of signals 320 and 340. Since signal 320 falls first from level E$h$ to E$l$, signal 314 is first similar to signal 320, as diode 111 becomes front biased and diode 113 becomes back biased. In a similar manner, as soon as the level of signal 320 rises above that of 340, signal 314 assumes substantially the waveshape of signal 340, as diode 113 becomes front biased and diode 111 becomes back biased.

As the potential at junction 114 varies according to signal 314, capacitor 115 discharges from its original voltage level E$h$ to the new level E$l$, through load resistor 132 and either of sources 120 or 140, depending upon which is producing the lower-level signal. Since each of sources 120 and 140 is a low-impedance source, the discharge time for capacitor 115 is dependent substantially upon its capacitance and the resistance of load resistor 132.

Except for the peculiar waveshape of the signal appearing at junction 114, then, the signal appearing across load resistor 132 would be an exponential discharge signal. However, at the beginning of the discharge period of capacitor 115, the voltage across load resistor 132 increases more rapidly than a normal exponential discharge voltage, due to the increasing voltage appearing at junction 114. When the voltage-state signal produced by source 140 drops to level E$l$, the signal appearing across load resistor 132, makes a second, negative-going change and then returns to the normal exponential discharge wave form. The second negative-going change is that portion which has been referred to as the "spurious" signal and may be sufficiently negative to fall below the triggering level of the flip-flop to be controlled. This level is designated as E$t$ in Figures 3 and 4. The first negative-going portion of signal 336, it will be noted, is the desired triggering pulse which indicates that the "and" function has a value of $l$.

One embodiment of a pulse-gating circuit according to the present invention for providing an operation similar to that described above, is shown in Fig. 2, where it may be seen that pulses produced by a negative pulse source 220 are applied by pulse-gating circuit 210 to a flip-flop input circuit 230 in response to voltage-state signal sources 240–$a$, ... and 240–$n$.

Figure 2:
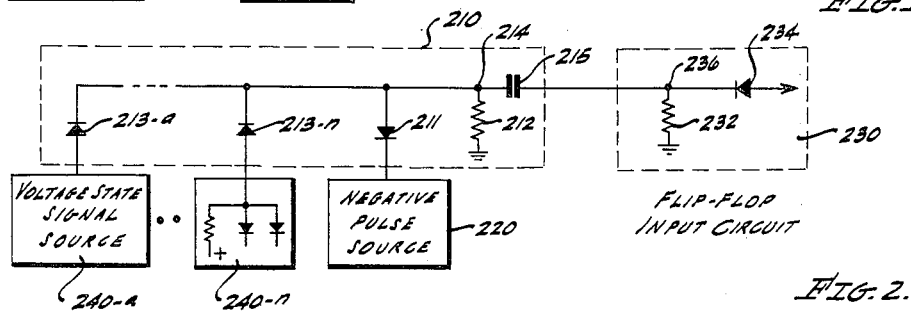
Fig. 2 is a schematic diagram of a diode, pulse-gating circuit according to the present invention.

As shown in Fig. 2, pulse-gating circuit 210 comprises: an input diode 211 having its cathode coupled to the output terminal of negative pulse source 220; a gating resistor 212 having one end connected to the anode of diode 211 at a junction 214, and the other end connected to ground; $n$ input diodes 213–$a$ through 213–$n$ having their anodes connected to voltage-state signal sources 240–$a$ through 240–$n$, respectively, and having their cathodes coupled in parallel to the junction 214 of diode 211 and gating resistor 212; and a capacitor 215 coupling junction 214 to input circuit 230.

Input circuit 230 includes a load resistor 232 having one end connected to capacitor 215 at a junction 236 and the other end connected to ground, and a diode 234, having its cathode connected to the junction 236 of load resistor 232 and capacitor 215, and its anode coupled to the flip-flop which is to be controlled.

Consider now the operation of the circuit shown in Fig. 2 under the operating conditions considered above, reference being made also to Fig. 4. Wave forms 420 and 440 shown in Fig. 4 correspond to wave forms 320 and 340 of Fig. 3, and are produced by signal sources 220 and 240–$a$, respectively. In the particular operation considered, it is assumed that the circuit shown in Fig. 2 includes only one voltage-state signal source 240–$a$. It will be noted that wave forms 414 and 436 in Fig. 4, corresponding to wave forms 314 and 336 of Fig. 3, respectively, do not include any sharply changing portions due to the change in level of the voltage-state signal source.

The reason for this is that diode 213–$a$ does not become front biased as signal 440 falls below signal 420; and consequently, the discharge path for capacitor 215 has a much greater time constant than the corresponding discharge path for capacitor 115 in the circuit of Fig. 1. As a result, wave form 414 does not assume the waveshape of wave form 440, but rather has a gradual exponential decay after signal 440 assumes a lower level than signal 420.

Signal 436 appearing across load resistor 232, then, no longer includes the second sharp, negative-going portion. The positive-going portion causes no difficulty because diode 234 in input circuit 230 prevents a positive signal from affecting the flip-flop to be controlled.

From the operation thus considered, it may be seen then that the present invention eliminates spurious triggering signals under the same operating conditions as those described above for the pulse-gating circuit of Fig. 1.

Consider now the operation of the circuit shown in Fig. 2 in providing the combined "and" and "or" function $(a+ \ldots + \ldots + \ldots +n).Cp$.

When any one of the voltage-state signals produced by sources 240 through 240–$n$ are high-level signals, the corresponding input diode is front biased and a high-level signal appears at junction 214. Capacitor 215, then, charges to a voltage difference equal to E$h$, where E$h$ again is the higher of the two levels of the voltage-state signals. When a count or timing pulse is produced by negative pulse source 220, then, diode 211 is front biased and signal 414 at junction 214 has a waveshape substantially the same as that of signal 420. The signal appearing across load resistor 232, as capacitor 215 discharges, may be similar to signal 414 shown in Fig. 4, if one of the voltage-state signals returns suddenly to level E$h$, or it may be substantially a reproduction of the signal produced by source 220, if none of the voltage-state signal levels change. Thus, the high-level state of any one of signals 240–$a$ through 240–$n$ is the "or" condition desired, and the application of the count pulse or time pulse is the "and" condition.

While the voltage-state signals may be derived directly from flip-flops, it is desirable to include an isolation network to prevent negative pulses produced by source 220 from being applied to the flip-flop input circuit. An isolation network which is suitable is illustrated in voltage-state signal source 240–$n$. It will be noted that this network may also be considered an "and" circuit of a conventional type; and thus, it is possible to provide a function $(a+x.y)$. Cp, where $x$ and $y$ are signals produced by source 240–$n$.

Figure 5:
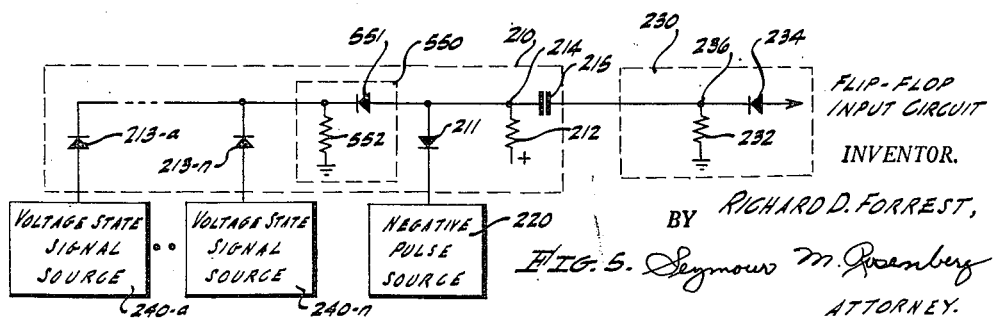
Fig. 5 is a schematic diagram of another form of diode, pulse-gating circuit according to the present invention.

Another way of providing isolation between source 220 and other flip-flops which may be in the system, is shown in Fig. 5. Referring now to Fig. 5, it will be noted that the circuit shown therein is substantially the same as that shown in Fig. 2 (similar elements being given the same reference numeral), except that an isolation network 550 is introduced between the parallel-coupled voltage-state signal sources and junction 214; and that gating resistor 212 is now connected to a positive potential, not shown. The potential applied to gating resistor 212 is somewhat greater than E$h$. In an illustrative embodiment, where E$h$ and E$l$ are 140 volts, and 125 volts, respectively, the potential applied to gating resistor 212 is 265 volts.

As shown in Fig. 5, the isolation network 550 includes a diode 551, having its anode connected to junction 214 and its cathode connected to one end of an isolation resistor 552. The other end of isolation resistor 552 is connected to ground. The junction of diode 551 and resistor 552 is connected to cathodes of parallel-connected diodes 213–a through 213–n. The operation of the circuit shown in Fig. 5 is substantially the same of that of the circuit shown in Fig. 2, further consideration therefore being deemed unnecessary.

While the embodiments described herein have been limited to those responsive to negative, counting or timing pulses, it should be apparent to one skilled in the art that the positive pulses may be used as well, provided that suitable changes are made in the diode connections and applied potentials. In one manner of converting the circuit shown in Fig. 2 from a negative pulse system into a positive pulse system, all of the diodes are reversed and the ground connection made to gating resistor 212 is changed to a connection to a positive potential, such as that described above.

It is apparent from the foregoing description that the present invention provides a diode, pulse-gating circuit, wherein no spurious trigger pulse is caused due to the delayed change of an applied voltage-state signal from a high level to a low level; and wherein "and" and "or" logic may be combined. While only two species have been shown in detail, other modifications will be apparent to one skilled in the art.

What is claimed is:

1. In a computer system, wherein triggering pulses are selectively applied to a first flip-flop in response to one voltage level of a two-level control signal derived from the conduction state of a second flip-flop, the triggering pulses being also selectively applied to the second flip-flop, the combination comprising: a first diode having anode and cathode terminals; first means for applying the triggering pulses to one terminal of said first diode; second means for applying the control signal to the other terminal of said first diode, said second means including a second diode having anode and cathode terminals and coupling means for connecting the anode terminal of one of said diodes to the cathode terminal of the other of said diodes; and output means including a capacitor and a gating resistor having one end connected to said capacitor, the common junction of said resistor and capacitor being connected to said other terminal of said first diode, said output means producing an output pulse upon time coincidence between an applied triggering pulse and the one voltage level of the control signal.

2. A diode pulse-gating circuit for selectively passing applied negative pulses in response to one voltage level of a two-level electrical control signal, said pulse-gating circuit comprising: a first diode having anode and cathode terminals; first means for applying the negative pulses to the cathode terminal of said first diode; second means for applying the control signal to the anode terminal of said first diode, said second means including a second diode having anode and cathode terminals, an isolation resistor having one end connected to the cathode terminal of said second diode, and a third diode having a cathode terminal connected to said one end of said isolation resistor and an anode terminal connected to the anode terminal of said first diode, the control signal being applied to the anode terminal of said second diode so that said first and second diodes are front biased when the level of an applied negative pulse is lower than the level of the control signal and back biased when the level of the control signal is lower than the level of an applied negative pulse; and output means, including a capacitor electrically connected to the anode terminal of said first diode, for producing an output pulse upon time coincidence between an applied negative pulse and the one voltage level of the control signal.

3. A gating circuit for selectively passing pulses of an applied pulse series in response to a predetermined voltage level of at least one of a plurality of applied two-level control signals, said gating circuit comprising: a first diode having anode and cathode terminals; a plurality of second diodes, one for each of said control signals, each of said second diodes having an anode terminal and a cathode terminal; coupling means connecting one terminal of said first diode to the opposite terminal of each of said second diodes so as to form a circuit for passing current in only one direction through said first diode in series with a parallel configuration of said second diodes; first means for applying the pulse series to the other terminal of said first diode; second means for applying the plurality of control signals individually to the other terminals of said plurality of second diodes; and output means including a capacitor electrically connected to said one terminal of said first diode for producing an output pulse upon time coincidence of an applied pulse and the predetermined voltage level of at least one of said control signals.

4. The gating circuit claimed in claim 3 wherein said applied pulses are of negative polarity, said predetermined voltage level is the relatively high level, said one terminal of said first diode is the anode terminal, said opposite terminal of each of said second diodes is the cathode terminal, said other terminal of said first diode is the cathode terminal, and said other terminals of said plurality of second diodes are the anode terminals, whereby said plurality of second diodes provides an "or" circuit for said plurality of control signals, and said first diode together with said output means provides an "and" circuit for combining said applied pulses with the output signal from said "or" circuit.

5. A diode, pulse-gating circuit for selectively passing applied negative pulses in response to one voltage level of a two-level electrical control signal, said pulse-gating circuit comprising: a first diode having anode and cathode terminals; first means for applying the negative pulses to the cathode terminal of said first diode; a second diode having anode and cathode terminals; second means for applying the control signal to the anode terminal of said second diode; coupling means connected between the cathode of said second diode and the plate of said first diode so that said diodes are front biased when the level of an applied negative pulse is lower than the level of the control signal and back biased when the level of the control signal is lower than the level of an applied negative pulse, said coupling means including an isolating network; and output means including a capacitor electrically connected to the anode terminal of said first diode.

References Cited in the file of this patent

UNITED STATES PATENTS

| | | |
|---|---|---|
| 2,535,303 | Lewis | Dec. 26, 1950 |
| 2,570,716 | Rochester | Oct. 9, 1951 |
| 2,628,346 | Burkhart | Feb. 10, 1953 |
| 2,636,133 | Hussey | Apr. 21, 1953 |
| 2,644,887 | Wolfe, Jr. | July 7, 1953 |
| 2,644,897 | Lo | July 7, 1953 |
| 2,679,617 | Mullaney et al. | May 25, 1954 |
| 2,685,039 | Scarbrough et al. | July 27, 1954 |

OTHER REFERENCES

Proceedings of I. R. E., May 1950, pp. 511 to 514, "Diode Coincidence and Mixing Circuits in Digital Computers," by Tung Chang Chen.